United States Patent
Miller

(10) Patent No.: US 7,132,076 B2
(45) Date of Patent: Nov. 7, 2006

(54) METHOD AND APPARATUS FOR BLOW MOLDING

(75) Inventor: Paul Alan Miller, Cement City, MI (US)

(73) Assignee: Uniloy Milacron Inc., Tecumseh, MI (US)

( * ) Notice: Subject to any disclaimer, the term of this patent is extended or adjusted under 35 U.S.C. 154(b) by 361 days.

(21) Appl. No.: 10/884,160

(22) Filed: Jul. 2, 2004

(65) Prior Publication Data
US 2006/0003045 A1    Jan. 5, 2006

(51) Int. Cl.
*B29C 49/64* (2006.01)

(52) U.S. Cl. .................. 264/523; 249/79; 264/237; 425/526

(58) Field of Classification Search ............ 425/525, 425/526; 264/523, 237; 249/79
See application file for complete search history.

(56) References Cited

U.S. PATENT DOCUMENTS

| | | | | |
|---|---|---|---|---|
| 3,768,948 A | * | 10/1973 | Horberg et al. | 425/526 |
| 3,843,286 A | * | 10/1974 | Horberg et al. | 425/526 |
| 5,255,889 A | * | 10/1993 | Collette et al. | 425/525 |
| 5,585,125 A | | 12/1996 | Iizuka et al. | |
| 5,762,981 A | | 6/1998 | Nitsche | |
| 5,971,740 A | * | 10/1999 | Rees | 425/526 |
| 6,428,302 B1 | | 8/2002 | Tsau | |
| 6,444,159 B1 | | 9/2002 | Petre | |
| 7,025,584 B1 | * | 4/2006 | Tsau | 425/526 |

FOREIGN PATENT DOCUMENTS

DE    19925756 A1 * 12/2000

\* cited by examiner

*Primary Examiner*—Robert B. Davis
(74) *Attorney, Agent, or Firm*—John W. Gregg

(57) ABSTRACT

An apparatus and method for blow molding an article having a concave base wherein a mold has a base component comprising a molding surface for forming at least a portion of the concave base and a path for conduction of heat transfer fluid through channels within the base component. Improved heat transfer is effected in the base component by locating the channels at a plurality of distinct depths therein.

8 Claims, 4 Drawing Sheets

METHOD AND APPARATUS FOR BLOW MOLDING

I. BACKGROUND OF THE INVENTION

1. Field of the Invention

This invention relates generally to blow molding. In particular, this invention relates to apparatus and methods for heat transfer in mold components for blow molding.

2. Description of Related Art

Molds for blow molding articles having bases including concave portions are known wherein the molds comprise left and right mold halves and a base component. Further, it is known to provide passages within the mold members for conduction of heat transfer fluid to enhance temperature conditioning of the material from which the articles are formed. In this regard, it is known to use heat transfer fluid to remove heat from the material after expansion to the shape of the mold cavity to reduce the time required for the expanded article to become sufficiently solid for removal from the mold without unacceptable deformation. To effectively remove heat from the concave base of an article, it is known to provide conduction of heat transfer fluid proximate the molding surface of the base component of the mold. As a consequence of the required projection of the base component to form the concave portion of the molded article, the base component has a relatively large thermal mass. However, it is common that the molding surface of the base component includes features defining localized variations in depth of the projection. Consequently, heat transfer within the base component is subject to localized variations of thermal mass creating localized differences in heat transfer from the molding surface. Known arrangements of heat transfer for such mold components are not effective to accommodate these differences. Hence, there is a continuing need for providing improved heat transfer effectiveness for blow molding articles having concave bases.

II. SUMMARY OF THE INVENTION

It is an object of the present invention to provide a mold for blow molding an article having a concave base wherein a base component of the mold provides effective heat transfer to material of the article proximate the molding surface of the base component.

It is a further object of the present invention to provide a mold for blow molding an article having a concave base wherein a base component of the mold provides a path for conduction of heat transfer fluid through a plurality of depths within the base component to effect heat transfer to the material of the article proximate the molding surface of the base component.

It is a still further object of the present invention to provide a method of blow molding an article having a concave base wherein heat transfer of material of the base of the article proximate a molding surface is effected by conduction of heat transfer fluid through a plurality of depths within a mold component on which at least a portion of the molding surface is formed.

Further objects and advantages of the invention shall be made apparent from the accompanying drawings and the following description thereof.

In accordance with the aforesaid objects a mold for blow molding an article having a concave base comprises a base component comprising a mounting plate having connections for supply and return of a heat transfer fluid, a body having a molding surface defining the shape of the at least one portion of a concave base of the container and a mounting surface substantially opposite the molding surface and having a recess therein having a floor spaced from the molding surface, at least two channels located in the body, each channel comprising an inlet end and an outlet end, at least one channel located in the floor of the recess and lying proximate a portion of the molding surface, at least one channel located in the mounting surface, the inlet end thereof intersecting the recess and connecting to an inlet in the body for conducting heat transfer fluid thereinto, the outlet end thereof intersecting the recess and connecting to an outlet in the body for conducting heat transfer fluid therefrom, the channel in the mounting surface being located at a depth relative to the mounting surface less than the depth of the channel in the floor of the recess, an insert receivable in the recess and defining a communicating passage between an inlet end of at least one channel in the mounting surface and an inlet end of at least one channel in the floor of the recess and defining a communicating passage between an outlet end of at least one channel in the floor of the recess and an outlet end of at least one channel in the mounting surface, whereby heat transfer fluid is conducted serially through the inlet ends of the channels to progressively greater depths and serially through the outlet ends of the channels to progressively lesser depths. Further, in accordance with the present invention, a method of blow molding an article having a concave base comprises conduction of a heat transfer fluid through a base component of the mold, the base component comprising a mounting plate having connections for supply and return of a heat transfer fluid, a body having a molding surface defining the shape of the at least one portion of a concave base of the container and a mounting surface substantially opposite the molding surface and having a recess therein having a floor spaced from the molding surface, at least two channels located in the body, each channel comprising an inlet end and an outlet end, at least one channel located in the floor of the recess and lying proximate a portion of the molding surface, at least one channel located in the mounting surface, the inlet end thereof intersecting the recess and connecting to an inlet in the body for conducting heat transfer fluid thereinto, the outlet end thereof intersecting the recess and connecting to an outlet in the body for conducting heat transfer fluid therefrom, the channel in the mounting surface being located at a depth relative to the mounting surface less than the depth of the channel in the floor of the recess, an insert receivable in the recess and defining a communicating passage between an inlet end of at least one channel in the mounting surface and an inlet end of at least one channel in the floor of the recess and a communicating passage between an outlet end of at least one channel in the floor of the recess and an outlet end of at least one channel in the mounting surface, whereby heat transfer fluid is conducted serially through the inlet ends of the channels to progressively greater depths and serially through the outlet ends of the channels to progressively lesser depths.

III. BRIEF DESCRIPTION OF THE DRAWINGS

IV. DETAILED DESCRIPTION OF THE PREFERRED EMBODIMENT

The invention shall be illustrated and described with reference to a preferred embodiment which shall be described in detail. Certain variations of features of the preferred embodiment are expressly contemplated and included in the description thereof.

Figure 1:
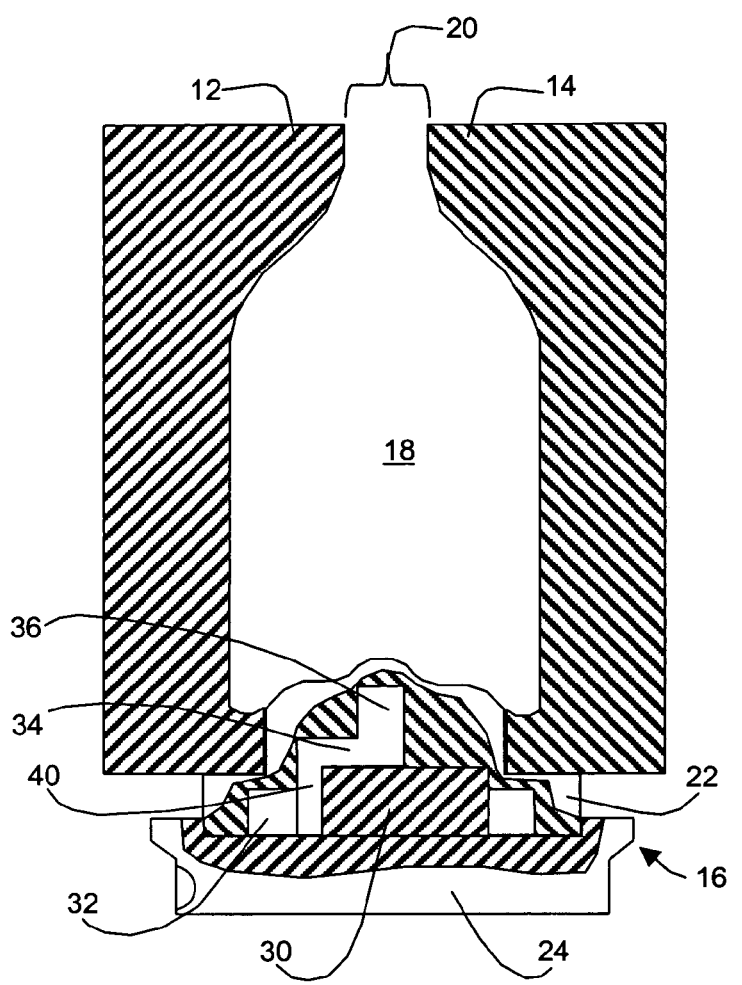
FIG. 1 illustrates a mold in partial cross section and including a base component in accordance with the invention.

Referring to FIG. 1 mold 10 comprises left mold half 12, right mold half 14 and base component 16. A mold cavity 18 defined by left and right mold halves 12 and 14 and base component 16 establishes the external shape of an article to be molded, advantageously a container. A finished article is produced in mold 10 from a so called "preform" or "parison" which is smaller than the finished article, is open at an end proximate neck portion 20 of mold 10 and is otherwise closed. The preform is retained within mold 10 proximate neck portion 20 and is expanded within mold 10 by introduction into the closed preform of a pressurized fluid, typically compressed air or by a combination of introduction of pressurized fluid and mechanical stretching of the preform longitudinally. As the preform expands, a concave base is formed in the lower end thereof by a projection of base component 16 into the interior of cavity 18.

Figure 2A:
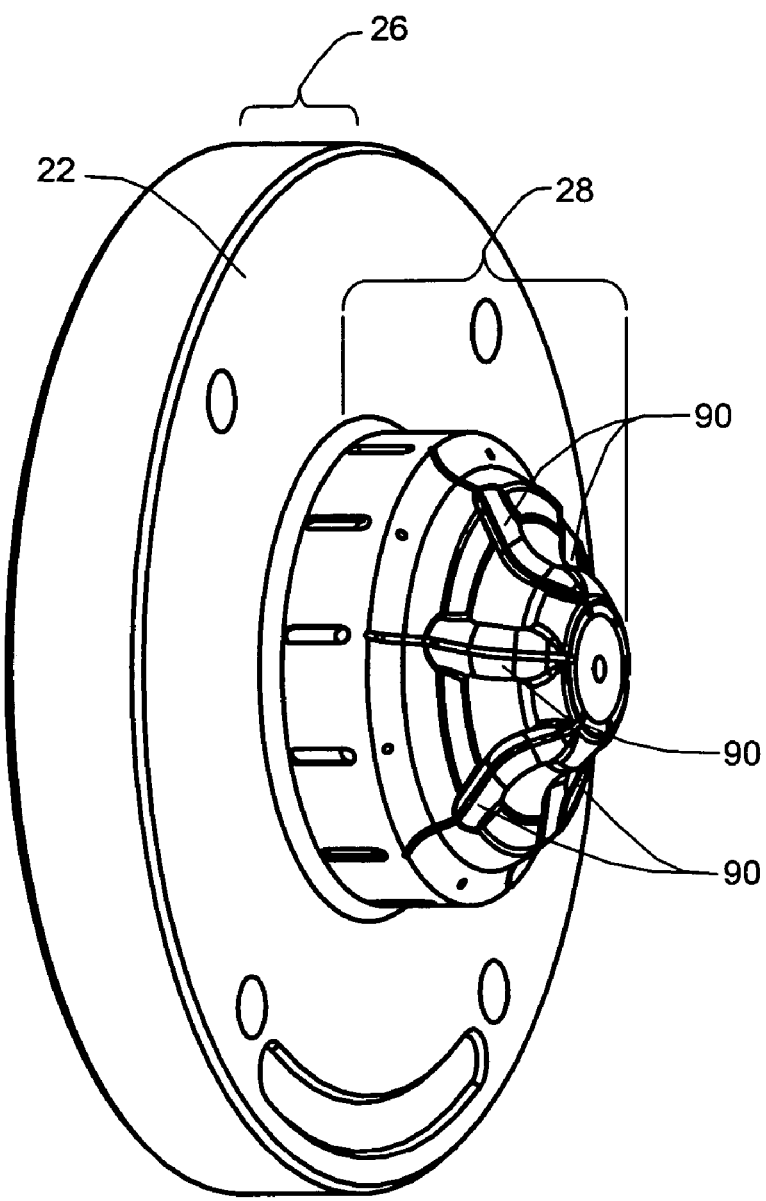
FIGS. 2a and 2b are three dimensional views of the mold base component of FIG. 1
Figure 2B:
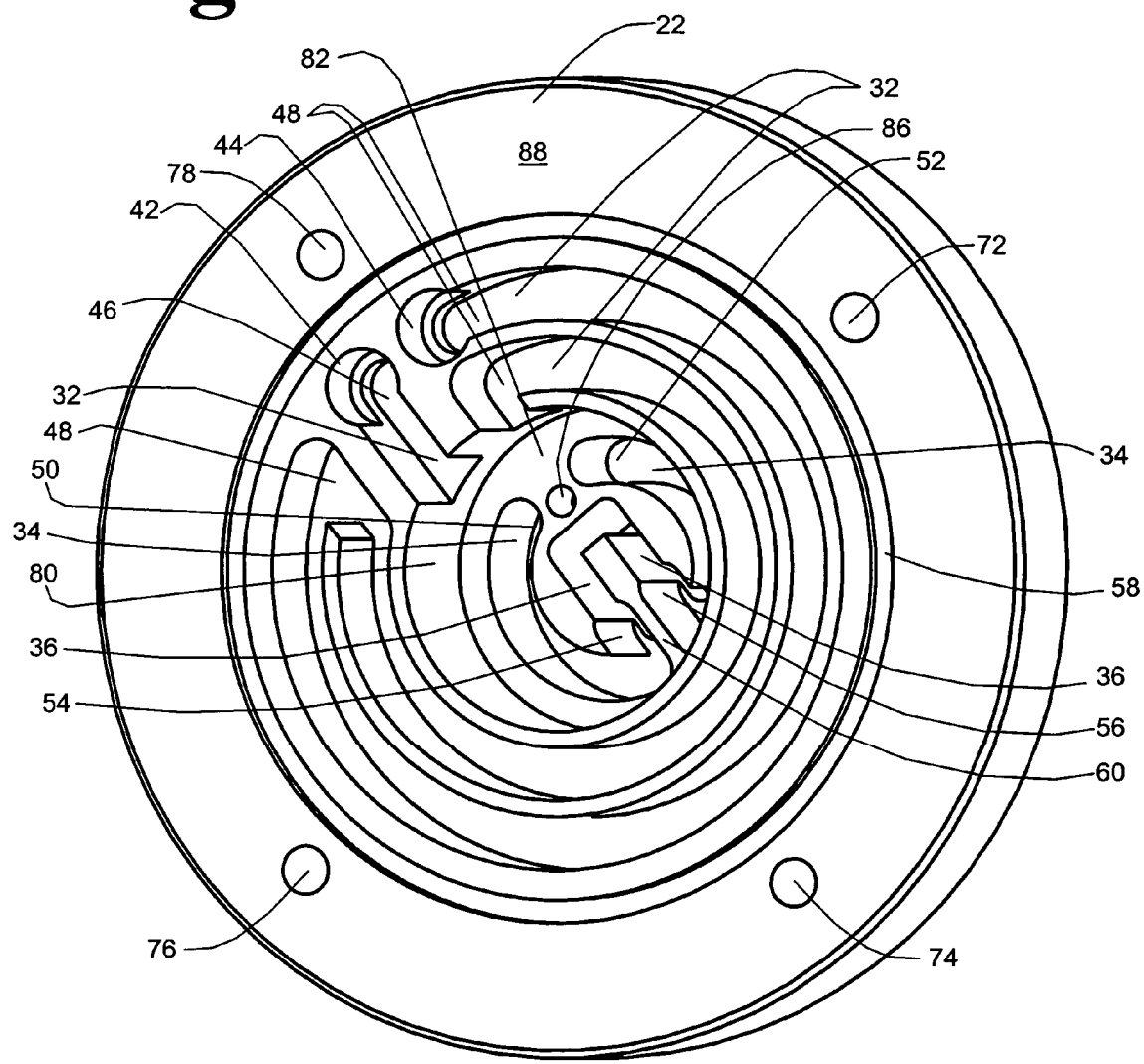

Referring to FIGS. 1, 2*a* and 2*b*, base component 16 comprises body 22 supported at a mounting surface 88 of body 22 by mounting plate 24. Body 22 comprises flange portion 26 seating against left and right mold halves 12 and 14 and a projection portion 28 comprising a molding surface substantially opposite mounting surface 88. The molding surface projects into cavity 18 to form at least a portion of the concave base of a container. The molding surface of projection portion 28 comprises features such as indentations 90 (FIG. 2*a*) that create localized variations of the distance from mounting surface 88 to the molding surface. Internal channels 32, 36 and 38 permit conduction of a heat transfer fluid within body 22 proximate the exterior of the article in contact with base component 16. While three internal channels are shown and described in the preferred embodiment, it is contemplated that at least two internal channels are effective to provide improved heat transfer effectiveness.

As seen in FIG. 2*b*, internal channels 32, 34 and 36 are open channels within body 22 that are completely covered when body 22, mounting plate 24 and insert 30 of base component 16 are assembled together. Channel 32 lies in mounting surface 88 and is completely covered by mounting plate 24 when body 22 is mounted to mounting plate 24. Channels 34 and 36 are formed in floor 82 of recess 80 and are completely covered by insert 30 when installed in body 22. While the construction of open channels described is advantageous at least for manufacture of the base component, at least portions of one or more of the channels may comprises a tubular conduit open only at the ends thereof. Further, although a single recess is shown in the preferred embodiment, it may be advantageous to provide substantially similar constructions of more than one recess and associated insert to achieve additional segregated depths of channels within body 22. A groove 58 in mounting surface 88 is provided to receive a sealing member, such as an "o-ring" to form a seal between mounting plate 24 and mounting surface 88. Connections for supply and return of heat transfer fluid are made to mounting plate 24 and passages therein provide connections to inlet and outlet openings in body 22 within the area circumscribed by the sealing member. Although only a single groove and seal is provided in the preferred embodiment, more than one groove and seal may be provided to accommodate localized variations of fit up of mounting plate 24 and mounting surface 88. Mounting holes 72–78 are provided in flange portion 26 for fixing body 22 to mounting plate 24 with fasteners (not shown).

Referring to FIG. 2*b*, inlet 42 is connected to the inlet end 46 of channel 32 and outlet 44 is connected to the outlet end 48 of channel 32. Each of the inlet end 46 and outlet end 48 of channel 32 intersects recess 80 in body 22. As shown, outlet end 48 includes a circuitous path between recess 80 and outlet 44. Channel 32 has a depth relative to mounting surface 88 less than the depth of either of channels 34 and 36. Channels 34 and 36 are formed in floor 82 of recess 80, channel 36 having a depth relative to mounting surface 88 greater than the depth of channel 34. Inlet end 50 of channel 34 connects to inlet end 54 of channel 36. Outlet end 52 of channel 34 connects with outlet end 56 of channel 36. Inlet end 50 of channel 34 is separated from outlet end 52 by rib 60, the connection between inlet end 50 and outlet end 52 being made through channel 36 which is continuous between inlet end 54 and outlet end 56 thereof. Were more than one recess provided, channels in the floors of the additional recesses would include inlet and outlet ends as described for channels 34 and 36.

Figure 4:
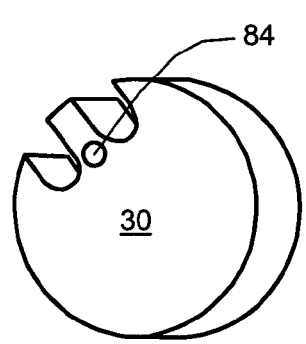
FIG. 4 is a three dimensional view of the insert shown in place in FIG. 3*b*.
Figure 3A:
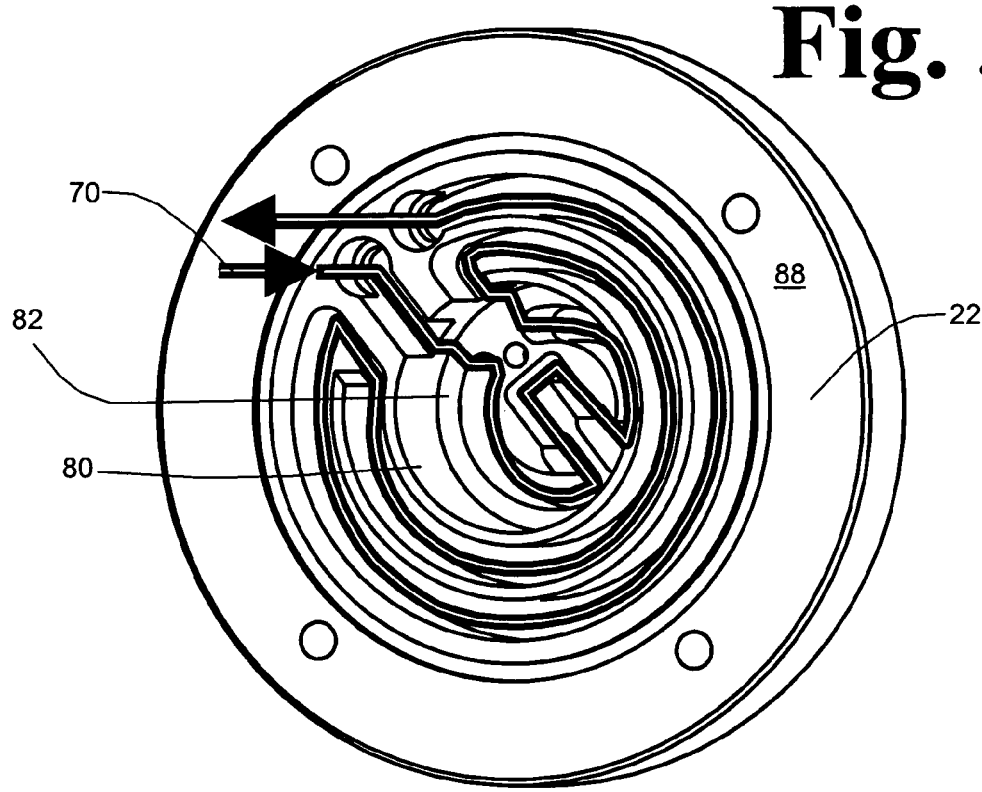
FIGS. 3a and 3b are views of the mold base component of FIG. 1 showing the path of flow of heat transfer fluid therein.
Figure 3B:
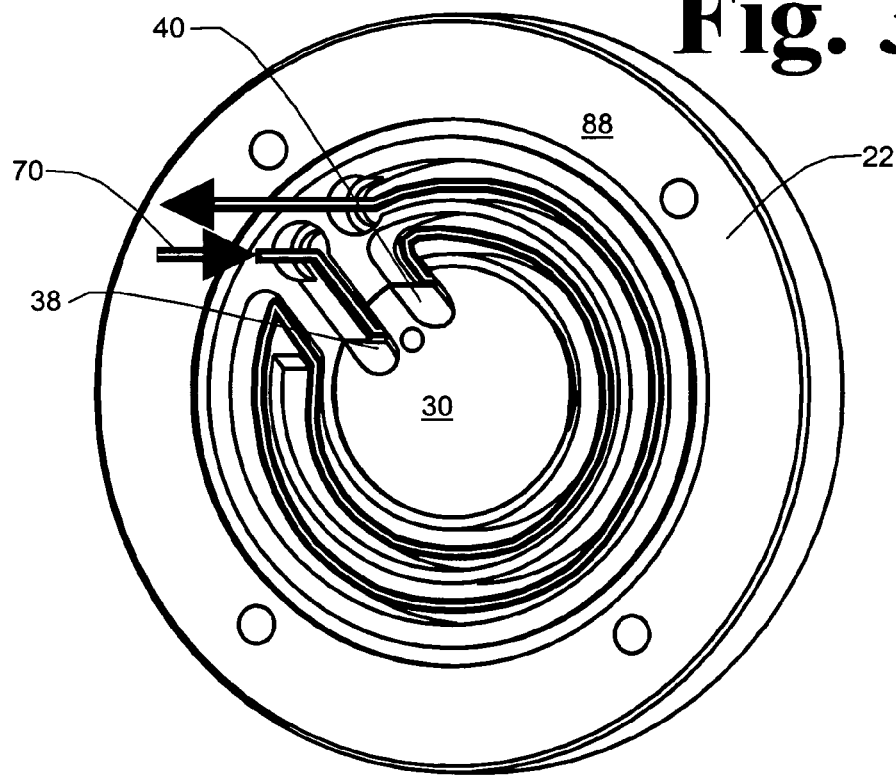

Referring to FIGS. 2*b*, 3*b* and 4, channels 32, 34 and 36 are open towards the mounting surface of body 22. Insert 30 is installed in body 22 to fill recess 80 and completely cover channels 34 and 36. Recesses in the side of insert 30 form communicating passages 38 and 40, communicating passage 38 connects inlet end 46 of channel 32 to inlet end 50 of channel 34 and communicating passage 40 connects outlet end 52 of channel 34 to outlet end 48 of channel 32. While convenient to provide the communicating passages by recesses in the side of insert 30, communicating passages could as well be provided by passages enclosed within insert 30 and connecting inlet and outlet ends of the channels as described. Further, the communicating passages could as well be provided by recesses in the side of recess 80 which would be covered by the side of insert 30. Hole 84 in insert 30 and hole 86 in floor 82 permit fixing insert 30 in recess 80 by a fastener (not shown).

Referring to FIGS. 3*a* and 3*b*, the path of heat transfer fluid through body 22 is illustrated by line 70. Heat transfer fluid enters body 22 at inlet 42 and exits at outlet 44. Inlet 42 and outlet 44 are open to passages in mounting plate 24 (not shown) which are connected to supply and return conduits. Heat transfer fluid is conducted from inlet end 46 of channel 32 through communicating passage 38 (FIG. 3*b*) to inlet end 50 of channel 34; from inlet end 50 of channel 34 to inlet end 54 of channel 36; through channel 36 to outlet end 56 thereof; from outlet end 56 of channel 36 to outlet end 52 of channel 34; from outlet end 52 of channel 34 through communicating passage 40 (FIG. 3*b*) to outlet end 48 of channel 32 and therefrom to outlet 44. In traveling this path, heat transfer fluid is conducted serially through the inlet ends of channels 32, 34 and 36 to progressively greater depths (relative to mounting surface 88) and then serially through the outlet ends of channels 36, 34 and 32 to progressively lesser depths (relative to mounting surface 88). As heat transfer fluid is admitted, it is conducted through a relatively short distance to channel 36 closest to the outer extremity of projection portion 28. The greatest difference between temperature of the heat transfer fluid and temperature of body 22 will be encountered at the inlet 42.

Hence, a higher rate of heat transfer between the heat transfer fluid and body 22 is possible nearer to inlet 42 (at constant rate of flow). The relatively short distance from inlet 42 to channel 36 yields a relatively high rate of heat transfer proximate channel 36, hence proximate the farthest extremity of the molding surface from the mounting surface. Further, the placement of channels 32, 34 and 36 at plural distinct depths within body 22 enhances effectiveness of heat transfer from the localized variations of depth of the molding surface.

While the preferred embodiment has been shown and described in detail, it is not the intention of applicant that the invention be limited to the preferred embodiment or such detail. Rather, it is intended that the invention be defined by the appended claims and equivalents thereof.

What is claimed is:

1. A mold for blow molding having a base component for forming at least one portion of a concave base of a blow molded container, the base component comprising a mounting plate having connections for supply and return of a heat transfer fluid, a body having a molding surface defining the shape of the at least one portion of a concave base of the container and a mounting surface substantially opposite the molding surface and having a recess therein having a floor spaced from the molding surface, at least two channels located in the body, each channel comprising an inlet end and an outlet end, at least one channel located in the floor of the recess and lying proximate a portion of the molding surface, at least one channel located in the mounting surface, the inlet end thereof intersecting the recess and connecting to an inlet in the body for conducting heat transfer fluid thereinto, the outlet end thereof intersecting the recess and connecting to an outlet in the body for conducting heat transfer fluid therefrom, the channel in the mounting surface being located at a depth relative to the mounting surface less than the depth of the channel in the floor of the recess, an insert receivable in the recess and defining a communicating passage between an inlet end of at least one channel in the mounting surface and an inlet end of at least one channel in the floor of the recess and a communicating passage between an outlet end of at least one channel in the floor of the recess and an outlet end of at least one channel in the mounting surface, whereby heat transfer fluid is conducted serially through the inlet ends of the channels to progressively greater depths and serially through the outlet ends of the channels to progressively lesser depths.

2. The mold of claim 1 wherein the base component comprises at least two channels in the floor of the recess, at least one of which has a depth relative to the mounting surface less than the depth of the others and wherein the inlet ends of the channels in the floor of the recess are connected together and the outlet ends of the channels in the floor of the recess are connected together so that heat transfer fluid is conducted serially through the inlet ends to progressively greater depths within the body and then through the outlet ends to progressively lesser depths within the body.

3. The mold of claim 2 wherein at least one of the channels is an open channel formed in the body and the open channels are completely covered when the body, mounting plate and insert of the base component are assembled together.

4. The mold of claim 1 further comprising at least one sealing member for forming a seal between the mounting plate and mounting surface and circumscribing the channels in the mounting surface and in the recess and the inlet and outlet in the body.

5. A method of blow molding using a mold having a base component forming at least a portion of a concave base of a container, the method comprising conduction of a heat transfer fluid through the base component, the base component comprising a mounting plate having connections for supply and return of a heat transfer fluid, a body having a molding surface defining the shape of the at least one portion of a concave base of the container and a mounting surface substantially opposite the molding surface and having a recess therein having a floor spaced from the molding surface, at least two channels located in the body, each channel comprising an inlet end and an outlet end, at least one channel located in the floor of the recess and lying proximate a portion of the molding surface, at least one channel located in the mounting surface, the inlet end thereof intersecting the recess and connecting to an inlet in the body for conducting heat transfer fluid thereinto, the outlet end thereof intersecting the recess and connecting to an outlet in the body for conducting heat transfer fluid therefrom, the channel in the mounting surface being located at a depth relative to the mounting surface less than the depth of the channel in the floor of the recess, an insert receivable in the recess and defining a communicating passage between an inlet end of at least one channel in the mounting surface and an inlet end of at least one channel in the floor of the recess and a communicating passage between an outlet end of at least one channel in the floor of the recess and an outlet end of at least one channel in the mounting surface, whereby heat transfer fluid is conducted serially through the inlet ends of the channels to progressively greater depths and serially through the outlet ends of the channels to progressively lesser depths.

6. The method of claim 5 wherein the base component comprises at least two channels in the floor of the recess, at least one of which has a depth relative to the mounting surface less than the depth of the others and wherein the inlet ends of the channels in the floor of the recess are connected together and the outlet ends of the channels in the floor of the recess are connected together so that heat transfer fluid is conducted serially through the inlet ends to progressively greater depths within the body and then through the outlet ends to progressively lesser depths within the body.

7. The method of claim 6 wherein at least one of the channels is an open channel formed in the body and the open channels are completely covered when the body, mounting plate and insert of the base component are assembled together.

8. The method of claim 5 wherein the mold component further comprises at least one sealing member for forming a seal between the mounting plate and mounting surface and circumscribing the channels in the mounting surface and in the recess and the inlet and outlet in the body.

* * * * *